United States Patent
Tanaka et al.

(10) Patent No.: US 10,941,241 B2
(45) Date of Patent: Mar. 9, 2021

(54) EPOXY RESIN MOLDING MATERIAL, MOLDED PRODUCT, MOLDED CURED PRODUCT, AND METHOD FOR PRODUCING MOLDED CURED PRODUCT

(71) Applicant: HITACHI CHEMICAL COMPANY, LTD., Tokyo (JP)

(72) Inventors: Kenji Tanaka, Tokyo (JP); Yuka Yoshida, Tokyo (JP); Shinichi Kosugi, Tokyo (JP); Shingo Tanaka, Tokyo (JP); Hideyuki Katagi, Tokyo (JP); Haruaki Sue, Tokyo (JP); Yoshitaka Takezawa, Tokyo (JP)

(73) Assignee: SHOWA DENKO MATERIALS CO., LTD., Tokyo (JP)

( * ) Notice: Subject to any disclaimer, the term of this patent is extended or adjusted under 35 U.S.C. 154(b) by 0 days.

(21) Appl. No.: 16/079,873

(22) PCT Filed: Aug. 25, 2016

(86) PCT No.: PCT/JP2016/074880
§ 371 (c)(1),
(2) Date: Aug. 24, 2018

(87) PCT Pub. No.: WO2017/145411
PCT Pub. Date: Aug. 31, 2017

(65) Prior Publication Data
US 2019/0055344 A1 Feb. 21, 2019

(30) Foreign Application Priority Data

Feb. 25, 2016 (JP) .............................. JP2016-034888

(51) Int. Cl.
*C08G 59/24* (2006.01)
*C08G 59/62* (2006.01)
*C08G 59/68* (2006.01)
*C08K 3/22* (2006.01)

(52) U.S. Cl.
CPC ......... *C08G 59/245* (2013.01); *C08G 59/621* (2013.01); *C08G 59/688* (2013.01); *C08K 3/22* (2013.01); *C08K 2003/2227* (2013.01)

(58) Field of Classification Search
CPC .. C08G 59/245; C08G 59/621; C08G 59/688; C08K 3/22
USPC ....................................................... 525/523
See application file for complete search history.

(56) References Cited

U.S. PATENT DOCUMENTS

| | | | |
|---|---|---|---|
| 2003/0232964 A1 | 12/2003 | Akatsuka et al. | |
| 2004/0147709 A1 | 7/2004 | Akatsuka et al. | |
| 2006/0276568 A1 | 12/2006 | Akatsuka et al. | |
| 2014/0042662 A1* | 2/2014 | Tamada .................. | B32B 38/10 |
| | | | 264/138 |

FOREIGN PATENT DOCUMENTS

| | | |
|---|---|---|
| CN | 1233626 A | 11/1999 |
| CN | 1465607 A | 1/2004 |
| CN | 102211984 A | 10/2011 |
| CN | 103328531 A | 9/2013 |
| CN | 104024332 A | 9/2014 |
| JP | 2002-226550 A | 8/2002 |
| JP | 2004-010762 A | 1/2004 |
| JP | 2004-161909 A | 6/2004 |
| JP | 2008-013759 A | 1/2008 |
| JP | 4118691 B2 | 7/2008 |
| JP | 2010-241797 A | 10/2010 |
| JP | 1619770 B2 | 1/2011 |
| JP | 5127164 B2 | 1/2013 |
| JP | 2013-087137 A | 5/2013 |
| JP | 2013-234313 A | 11/2013 |
| JP | 5471975 B2 | 4/2014 |
| JP | 2015-059186 A | 3/2015 |
| JP | 2015-209529 A | 11/2015 |
| WO | 02/094905 A1 | 11/2002 |

OTHER PUBLICATIONS

The 64th Symposium on Macromolecules S22. "Recent Developments in Synthesis of Networked Polymers and Their Novel Properties and Functions", Sep. 17, 2015, Hitachi Chemical Co., Ltd. Kenji Tanaka, Yuka Yoshida, Shinichi Kosugi, Hideyuki Katagi, Haruaki Sue, Yoshitaka Takezawa.

The 65th Symposium on Networked Polymer, "Behavior of High-Order Structure Formation of Reaction-Induced Smectic Type Mesogen Epoxy Resin", Hitachi Chemical Co., Ltd. Yuka Yoshida, Kenji Tanaka, Hideyuki Katagi, Yoshihiro Amano, Yoshitaka Takezawa, Hitachi, Ltd. Shingo Tanaka, Oct. 8, 2015.

"Transfer Molding Composite Using Reaction-Induced Smectic Type Mesogen Epoxy Resin" Hitachi Chemical Co., Ltd. Kenji Tanaka, Yuka Yoshida, Shinichi Kosugi, Hideyuki Katagi, Haruaki Sue, Yoshitaka Takezawa, published Aug. 25, 2015.

(Continued)

*Primary Examiner* — David T Karst
(74) *Attorney, Agent, or Firm* — Fitch, Even, Tabin & Flannery, L.L.P.

(57) ABSTRACT

The present disclosure provides: an epoxy resin molding material including; an epoxy resin having a mesogen structure, a phenolic curing agent, an inorganic filler, and a curing accelerator having a quaternary phosphonium cation represented by the following Formula (I); a molded product and a molded cured product using the epoxy resin molding material; and a method for producing a molded cured product. In Formula (I), each of $R^a$ to $R^d$ independently represents an alkyl group having from 1 to 6 carbon atoms, or an aryl group, and the alkyl group and the aryl group may have a substituent.

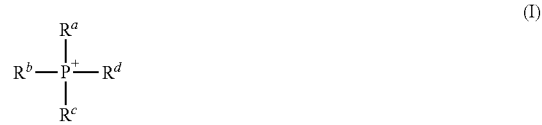

(I)

19 Claims, No Drawings

(56) References Cited

OTHER PUBLICATIONS

"Behavior of High-Order Structure Formation of Reaction-Induced Smectic Type Mesogen Epoxy Resin" Hitachi Chemical Co., Ltd. 1, and Hitachi. Ltd.2 Yuka Yoshida, Kenji Tanaka, Hideyuki Katagi, Yoshihiro Amano, Yoshitaka Takezawa, and Shingo Tanaka, published Oct. 7, 2015.

* cited by examiner

EPOXY RESIN MOLDING MATERIAL, MOLDED PRODUCT, MOLDED CURED PRODUCT, AND METHOD FOR PRODUCING MOLDED CURED PRODUCT

CROSS-REFERENCE TO RELATED APPLICATIONS

This application is a U.S. national phase application filed under 35 U.S.C. § 371 of International Application No. PCT/JP2016/074880, filed Aug. 25, 2016, which claims priority from Japanese Patent Application No. 2016-034888, filed Feb. 25, 2016, designating the United States, which are hereby incorporated herein by reference in their entirety.

TECHNICAL FIELD

The present disclosure relates to an epoxy resin molding material, a molded product, a molded cured product, and a method for producing a molded cured product.

BACKGROUND ART

Thermosetting resins such as epoxy resins are widely used for insulating materials for use in apparatuses such as motors and inverters for industries and automobiles, in terms of high insulating performance, easiness of molding, heat resistance, and the like. In recent years, an increase in output and a decrease in size of such apparatuses have rapidly progressed, and also characteristics required for insulating materials have been much raised in level. In particular, the amount of heat generated from conductors densified according to a decrease in apparatus size tends to be increased, and an important problem is that such heat is diffused as much as possible. Various measures have been taken in order to enhance heat conducting property of thermosetting resins molded.

There is proposed a cured product of a resin composition including an epoxy resin having a mesogen structure which is used a thermosetting resin having high heat conducting property (see, for example, Patent Document 1). Epoxy resins having a mesogen structure are shown in, for example, Patent Documents 2 to 4. There is also proposed an epoxy resin having a specific structure, described in Patent Document 5, as a thermosetting resin having high heat conducting property and a low softening point (melting point).

One procedure for enhancing heat conducting property of a thermosetting resin molded includes mixing of an inorganic filler high in heat conducting property with such a thermosetting resin (see, for example, Patent Document 6).

RELATED ART DOCUMENT

Patent Document

Patent Document 1: Japanese Patent Publication (JP-B) No. 4118691
Patent Document 2: JP-B No. 4619770
Patent Document 3: Japanese Patent Application Laid-Open (JP-A) No. 2010-241797
Patent Document 4: JP-B No. 5471975
Patent Document 5: JP-B No. 5127164
Patent Document 6: JP-A No. 2008-13759

SUMMARY OF INVENTION

Technical Problem

In a case in which an inorganic filler is mixed with a thermosetting resin, the viscosity of a resin composition tends to be increased according to an increase in the amount of the inorganic filler, resulting in a deterioration in workability and a decrease in dispersibility of the inorganic filler. The problem about affinity of the thermosetting resin as an organic substance to the inorganic filler is also often caused, and voids may occur at the interface between the thermosetting resin and the inorganic filler. Therefore, there may be caused a reduction in heat conductivity and a deterioration in long-term reliability of a composite material.

An epoxy resin having a mesogen structure tends to be higher in melting point due to the nature of the structure, and may have the problem of being difficult to mold due to a deterioration in fluidity of a resin composition. A solution for solving the problem, which can be considered, is a procedure where a disperser is added to thereby enhance fluidity of a resin composition. Such a procedure, however, does not exert high heat conducting property after curing, in some cases.

It is also considered that a process for curing and reacting an epoxy resin having a mesogen structure affects a heat conducting property after curing. Specifically, a low reaction activity of a curing accelerator not only increases the risk of reaction inhibition, but also may cause curing while the arrangement of the mesogen structure cannot be maintained, and such a failure can result in no exertion of high heat conducting property after curing.

The present disclosure has been made in view of the circumstances, and an object thereof is to provide an epoxy resin molding material which exerts high heat conducting property after curing, a molded product and a molded cured product using the epoxy resin molding material, and a method for producing a molded cured product.

Solution to Problem

Specific solutions to the above problem includes the following aspects.
<1> An epoxy resin molding material including:
an epoxy resin having a mesogen structure,
a phenolic curing agent,
an inorganic filler, and
a curing accelerator having a quaternary phosphonium cation represented by the following Formula (I):

in which, in Formula (I), each of $R^a$ to $R^d$ independently represents an alkyl group having from 1 to 6 carbon atoms, or an aryl group, and the alkyl group and the aryl group may have a substituent.
<2> The epoxy resin molding material according to <1>, in which a content of the curing accelerator is from 0.1 parts by mass to 2.0 parts by mass with respect to 100 parts by mass of the epoxy resin having a mesogen structure.

<3> The epoxy resin molding material according to <1> or <2>, in which the epoxy resin having a mesogen structure comprises an epoxy resin represented by the following Formula (II):

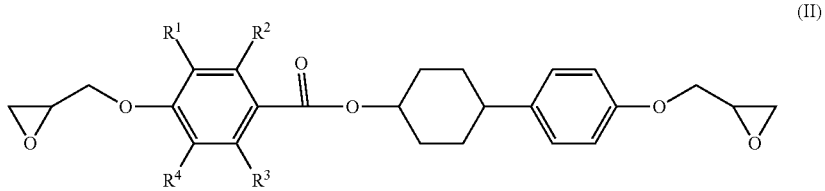

(II)

in which, in Formula (II), each of $R^1$ to $R^4$ independently represents a hydrogen atom, or an alkyl group having from 1 to 3 carbon atoms.

<4> The epoxy resin molding material according to <3>, in which the epoxy resin having a mesogen structure comprises a reaction product of a divalent phenol compound having two hydroxyl groups on one benzene ring, with the epoxy resin represented by Formula (II).

<5> The epoxy resin molding material according to <4>, in which the epoxy resin having a mesogen structure comprises a reaction product in which a ratio of the epoxy group equivalent of the epoxy resin represented by Formula (II) to the phenolic hydroxyl group equivalent of the divalent phenol compound (epoxy group equivalent/phenolic hydroxyl group equivalent) is from 100/10 to 100/20.

<6> The epoxy resin molding material according to <4> or <5>, in which the divalent phenol compound comprises hydroquinone.

<7> The epoxy resin molding material according to any one of <1> to <6>, in which the phenolic curing agent comprises a compound having a structural unit represented by at least one selected from the group consisting of the following Formula (III-1) and the following Formula (III-2):

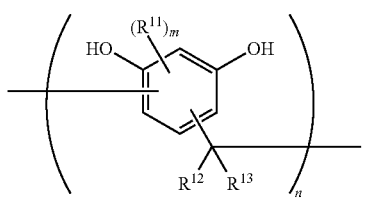

(III-1)

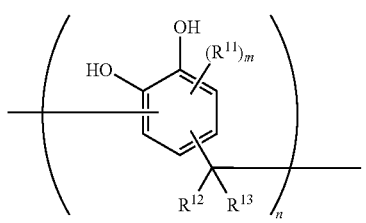

(III-2)

in which, in Formula (III-1) and Formula (III-2), each $R^{11}$ independently represents an alkyl group, an aryl group, or an aralkyl group, in which the alkyl group, the aryl group, and the aralkyl group may have a substituent; each of $R^{12}$ and $R^{13}$ independently represents a hydrogen atom, an alkyl group, an aryl group, or an aralkyl group, in which the alkyl group, the aryl group, and the aralkyl group may have a substituent; each m independently represents an integer from 0 to 2; and each n independently represents an integer from 1 to 7.

<8> The epoxy resin molding material according to any one of <1> to <7>, in which the phenolic curing agent comprises a compound having a partial structure represented by at least one selected from the group consisting of the following Formula (IV-1) to the following Formula (IV-4):

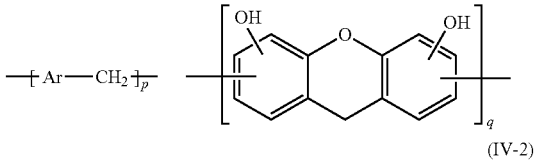

(IV-1)

(IV-2)

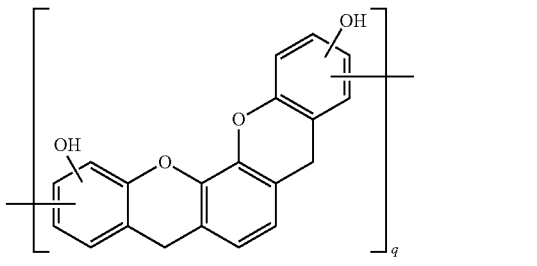

(IV-3)

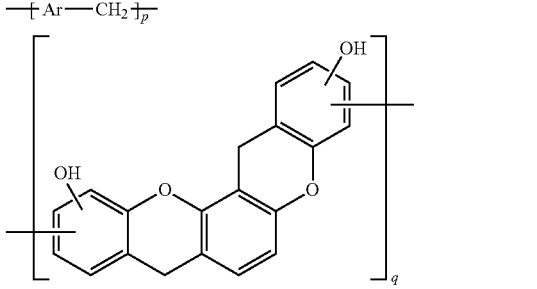

(IV-4)

in which, in Formula (IV-1) to Formula (IV-4), each of p and q independently represents a positive integer; and each Ar independently represents a group represented by the following Formula (IV-a) or the following Formula (IV-b); and

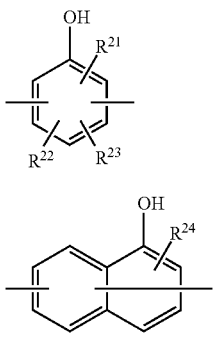

(IV-a)

(IV-b)

in which, in Formula (IV-a) and Formula (IV-b), each of $R^{21}$ and $R^{24}$ independently represents a hydrogen atom or a hydroxyl group; and each of $R^{22}$ and $R^{23}$ independently represents a hydrogen atom or an alkyl group having from 1 to 8 carbon atoms.

<9> The epoxy resin molding material according to any one of <1> to <8>, further including a silane coupling agent.

<10> The epoxy resin molding material according to <9>, in which the silane coupling agent comprises a silane coupling agent having a phenyl group.

<11> The epoxy resin molding material according to <10>, in which the silane coupling agent having a phenyl group has a structure in which a phenyl group is directly bound to a silicon atom.

<12> The epoxy resin molding material according to any one of <9> to <11>, in which an amount of attachment of a silicon atom derived from the silane coupling agent per specific surface area of the inorganic filler is from $5.0 \times 10^{-6}$ mol/m$^2$ to $10.0 \times 10^{-6}$ mol/m$^2$.

<13> The epoxy resin molding material according to any one of <1> to <12>, in which a content of the inorganic filler is from 60% by volume to 90% by volume of the solid content of the epoxy resin molding material.

<14> The epoxy resin molding material according to any one of <1> to <13>, which is in an A-stage state.

<15> The epoxy resin molding material according to <14>, in which a mass reduction rate after heating at 180° C. for 1 hour is 0.1% by mass or less.

<26> A molded product obtained by molding the epoxy resin molding material according to any one of <1> to <15>.

<17> The molded product according to <16>, having a diffraction peak in a diffraction angle 2θ range of from 3.0° to 3.5° in an X-ray diffraction spectrum obtained by an X-ray diffraction method using CuKα rays.

<18> A molded cured product obtained by curing the molded product according to <16> or <17>.

<19> The molded cured product according to <18>, having a diffraction peak in a diffraction angle 2θ range of from 3.0° to 3.5° in an X-ray diffraction spectrum obtained by an X-ray diffraction method using CuKα rays.

<20> A method for producing a molded cured product, the method including curing the molded product according to <16> or <17> by heating.

Advantageous Effects of Invention

According to the present disclosure, an epoxy resin molding material which exerts high heat conducting property after curing, a molded product and a molded cured product using the epoxy resin molding material, and a method for producing a molded cured product are provided.

DESCRIPTION OF EMBODIMENTS

Hereinafter, embodiments of the present invention will be described in detail. However, the present invention is not limited to the following embodiments. In the following embodiments, the constituent elements (including the element steps and the like) are not indispensable except when particularly explicitly mentioned. The same applies to numerical values and ranges thereof, and does not limit the present invention.

In the present specification, each numerical range specified using "(from) . . . to . . . " represents a range including the numerical values noted before and after "to" as the minimum value and the maximum value, respectively.

In the present specification, with respect to numerical ranges stated hierarchically herein, the upper limit or the lower limit of a numerical range of a hierarchical level may be replaced with the upper limit or the lower limit of a numerical range of another hierarchical level. Further, in the present specification, with respect to a numerical range, the upper limit or the lower limit of the numerical range may be replaced with a relevant value shown in any of Examples.

In the present specification, with respect to a content of a component in a composition, when plural kinds of substances exist corresponding to a component in the composition, the content means, unless otherwise specified, the total amount of the plural kinds of substances existing in the composition.

In the present specification, with respect to a particle diameter of a component in a composition, when plural kinds of particles exist corresponding to a component in the composition, the particle diameter means, unless otherwise specified, a value with respect to the mixture of the plural kinds of particles existing in the composition.

In the present specification, the term "process" denotes not only independent processes but also processes that cannot be clearly distinguished from other processes as long as a purpose is accomplished by the process.

<Epoxy Resin Molding Material>

An epoxy resin molding material in the present embodiment contains an epoxy resin having a mesogen structure, a phenolic curing agent, an inorganic filler, and a curing accelerator having a quaternary phosphonium cation represented by the following Formula (I). The epoxy resin molding material in the present embodiment may further contain, if necessary, other components.

(I)

In Formula (I), each of $R^a$ to $R^d$ independently represents an alkyl group having from 1 to 6 carbon atoms, or an aryl group, and the alkyl group and the aryl group may have a substituent.

The epoxy resin molding material in the present embodiment enables high heat conducting property to be exerted after curing. While the reason for this is not clear, it is considered because the curing accelerator having the quaternary phosphonium cation represented by Formula (I) is high in reaction activity, and thus can not only suppress curing inhibition, but also allow for curing without any breakage of the liquid crystallinity derived from the arrangement of the mesogen structure.

Hereinafter, each component contained in the epoxy resin molding material in the present embodiment will be described in detail.

—Epoxy Resin—

The epoxy resin molding material contains an epoxy resin having a mesogen structure. The epoxy resin having a mesogen structure tends to easily form a higher-order structure when cured, and tends to enable higher heat conductivity to be achieved when used to produce a cured product of the epoxy resin molding material.

The term "mesogen structure" refers to a molecular structure which is capable of exhibiting liquid crystallinity. Specific examples thereof include a biphenyl structure, a phenylbenzoate structure, an azobenzene structure, a stilbene structure, and derivatives thereof.

The term "higher-order structure" refers to a state in which such constituent components are microscopically aligned, and examples of such a structure include a crystal phase and a liquid crystal phase. Whether such a higher-order structure is present or not may be easily determined by observation using a polarization microscope. That is, it can be determined that the higher-order structure is present, in a case in which an interference pattern due to depolarization is observed in a crossed Nicol state. The higher-order structure is usually present in the resin in an island manner, and forms a domain structure. Each island forming a domain structure is referred to as a higher-order structural body. A structural unit constituting the higher-order structural body is generally covalently bound to each other.

The epoxy resin having a mesogen structure has the property of allowing phase transition from a crystal phase to a liquid crystal phase to occur. The phase transition temperature, at which the epoxy resin having a mesogen structure allows phase transition from a crystal phase to a liquid crystal phase to occur, is preferably 140° C. or less, more preferably 135° C. or less from the viewpoint of easiness of mixing in preparation of the epoxy resin molding material and moldability of the epoxy resin molding material.

The phase transition temperature may be measured using a differential scanning calorimetry (DSC) measurement apparatus (for example, Pyris 1 manufactured by PerkinElmer Co., Ltd.). Specifically, the temperature may be measured as a temperature at which any energy change (endothermic reaction) in accordance with a phase transition reaction occurs during differential scanning calorimetry measurement of 3 mg to 5 mg of a sample enclosed in an aluminum pan under conditions of a rate of temperature increase of 20° C./min, a measurement temperature range from 25° C. to 350° C. and a nitrogen flow rate of 20±5 mL/min in a nitrogen atmosphere.

The epoxy resin having a mesogen structure is not particularly limited as long as the epoxy resin has a mesogen structure. For example, the epoxy resin having a mesogen structure may be an epoxy resin monomer, or may be an oligomer of an epoxy resin monomer. The oligomer may be a reaction product of an epoxy resin monomer, or may be a prepolymer obtained by partially reacting a part of an epoxy resin monomer with a curing agent or the like. An epoxy resin monomer having a mesogen structure may be subjected to partial polymerization to result in an enhancement in moldability.

In particular, in a case in which the phase transition temperature of the epoxy resin monomer having a mesogen structure is more than 140° C., the epoxy resin monomer is preferably used as a reaction product prepolymerized by a reaction thereof with a divalent phenol compound having two hydroxyl groups as substituents on one benzene ring (hereinafter, also referred to as "specific divalent phenol compound".). Such a specific divalent phenol compound is preferably used from the viewpoint of control of the molecular weight of the epoxy resin, the heat conductivity, and the glass transition temperature (Tg).

In a case in which the epoxy resin monomer having a mesogen structure and the specific divalent phenol compound are partially reacted for prepolymer formation, the phase transition temperature can be decreased compared to a phase transition of only epoxy resin monomer. Therefore, mixing of the epoxy resin in preparation of the epoxy resin molding material is facilitated. In general, the epoxy resin monomer having a mesogen structure has a high phase transition temperature, and therefore a procedure for prepolymer formation is effective.

In a case in which the phenol compound for use in prepolymer formation is a monohydric phenol compound having one hydroxyl group in one molecule, the crosslinking density after curing may be reduced, thereby resulting in a reduction in heat conductivity. In a case in which the phenol compound for use in prepolymer formation is a polyhydric phenol compound having three or more hydroxyl groups in one molecule, the reaction may be difficult to control during prepolymer formation, thereby resulting in gelation. In a case in which a divalent phenol compound having two or more benzene rings is used, such a case allows the structure of the epoxy resin to be rigid and thus has the advantage of enhancing heat conductivity, but tends to cause an increase in softening point to result in a deterioration in handleability (see, for example, Japanese Patent Publication (JP-B) No. 5019272).

The curing agent to be reacted with the epoxy resin monomer having a mesogen structure may be an amine compound, other than the specific divalent phenol compound. In a case in which an amine compound is used, however, a secondary amine or a tertiary amine is generated in the epoxy resin formed into a prepolymer, and therefore storage stability of the epoxy resin by itself, and storage stability of the epoxy resin molding material after the epoxy resin is compounded with the curing agent may be deteriorated.

The epoxy resin having a mesogen structure may be used singly or in combination of two or more kinds thereof. Specific examples of the epoxy resin having a mesogen structure are described in, for example, JP-B No. 4118691. Specific examples of the epoxy resin having a mesogen structure include the following, but are not limited thereto.

Specific examples of the epoxy resin having a mesogen structure include 1-(3-methyl-4-oxiranylmethoxyphenyl)-4-(4-oxiranylmethoxyphenyl)-1-cyclohexene, 1-(3-methyl-4-oxiranylmethoxyphenyl)-4-(4-oxiranylmethoxyphenyl)-benzene, and 4-{4-(2,3-epoxypropoxy)phenyl}cyclohexyl=4-(2,3-epoxypropoxy) benzoate. Specific examples of the epoxy resin having a mesogen structure preferably include at least one selected from the group consisting of 1-(3-methyl-4-oxiranylmethoxyphenyl)-4-(4-oxiranylmethoxyphenyl)-benzene and 4-{4-(2,3-epoxypropoxy)phenyl}cyclohexyl=4-(2,3-epoxypropoxy)benzoate, from the viewpoint of an enhancement in heat conductivity.

Specific examples of the epoxy resin having a mesogen structure preferably include an epoxy resin which forms a smectic structure higher in ordering property as a reaction product with the curing agent, while singly forming a nematic structure low in ordering property, upon phase transition from a crystal phase to a liquid crystal phase, from the viewpoint of an enhancement in fluidity of the epoxy resin molding material. Examples of such an epoxy resin include an epoxy resin represented by the following Formula (II).

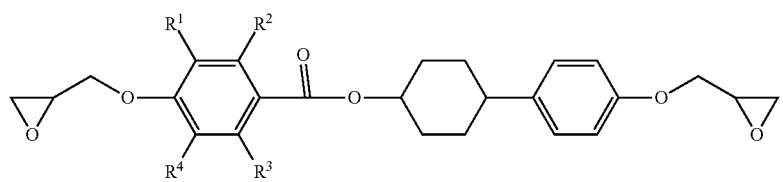

(II)

Among of the epoxy resin represented by Formula (II), an epoxy resin represented by the following Formula (II-1) is preferable.

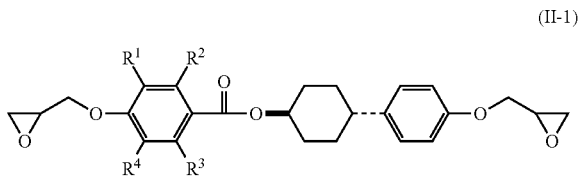

(II-1)

In Formula (II) and Formula (II-1), each of $R^1$ to $R^4$ independently represents a hydrogen atom, or an alkyl group having from 1 to 3 carbon atoms.

Specific examples of the epoxy resin having a mesogen structure preferably include a reaction product of the specific divalent phenol compound with the epoxy resin represented by Formula (II), more preferably a reaction product of the specific divalent phenol compound with an epoxy resin represented by Formula (II-1), from the viewpoint of an enhancement in moldability of the epoxy resin molding material.

Examples of the specific divalent phenol compound include catechol, resorcinol, hydroquinone, and derivatives thereof. Examples of such derivatives include a compound in which a benzene ring is substituted with an alkyl group having from 1 to 8 carbon atoms, or the like. Hydroquinone is preferably used as such a specific divalent phenol compound, from the viewpoint of an enhancement in heat conductivity. Since hydroquinone has a structure in which two hydroxyl groups on the benzene ring are in a para-position relationship, an epoxy resin formed into a prepolymer, obtained by a reaction with hydroquinone, has a straight structure. It is thus considered that stacking property of the molecule is high to allow a higher-order structure to be easily formed. The specific divalent phenol compound may be used singly or in combination of two or more kinds thereof.

In a case in which the epoxy resin having a mesogen structure includes a reaction product of the specific divalent phenol compound with the epoxy resin represented by Formula (II) or Formula (II-1) (hereinafter, also referred to as "epoxy resin partially formed into a prepolymer".), the epoxy resin partially formed into a prepolymer can be synthesized by, for example, dissolving the epoxy resin represented by Formula (II) or Formula (II-1), the specific divalent phenol compound, and a reaction catalyst in a synthesis solvent, and stirring the resulting solution with heating. The epoxy resin partially formed into a prepolymer can also be obtained by a reaction by melting the epoxy resin represented by Formula (II) or Formula (II-1) without any synthesis solvent. In this case, however, the epoxy resin must be heated to a high temperature at which the epoxy resin is molten. Therefore, a synthesis method using a synthesis solvent is preferable from the viewpoint of safety.

A ratio (a number of equivalents of epoxy group/a number of equivalents of a phenolic hydroxyl group), which is a ratio of the number of equivalents of the phenolic hydroxyl group in the specific divalent phenol compound and the number of equivalents of the epoxy group in the epoxy resin represented by Formula (II) or the formula (II-1), is preferably in a range of from 100/10 to 100/20, and more preferably from 100/10 to 100/15.

The synthesis solvent is not particularly limited as long as the solvent is capable of being warmed to a temperature necessary for allowing a reaction between the epoxy resin represented by Formula (II) or the formula (II-1) and the specific divalent phenol compound to proceed. Specific examples of the synthesis solvent include cyclohexanone, cyclopentanone, ethyl lactate, propylene glycol monomethyl ether and N-methylpyrrolidone.

The minimum amount of the synthesis solvent is adjusted so as to enables all the epoxy resin represented by Formula (II) or the formula (II-1), the specific divalent phenol compound and the reaction catalyst to be dissolved at the reaction temperature. While a solubility of a resultant solution may vary depending on types of raw materials before the reaction, types of the solvent and the like, a concentration of the solid content to be charged is preferably from 20% by mass to 60% by mass because a favorable viscosity range of a resin solution after synthesis tends to be achieved.

Type of the reaction catalyst is not particularly limited, and an appropriate catalyst may be selected in terms of the reaction speed, the reaction temperature, the storage stability, or the like. Specific examples of the reaction catalyst include an imidazole compound, an organic phosphorus compound, a tertiary amine and a quaternary ammonium salt. These catalysts may be used singly, or in combination of two or more kinds thereof. Among them, at least one selected from the group consisting of: an organic phosphine compound; a compound having intramolecular polarization, obtained by addition of a compound having a π bond such as maleic anhydride, a quinone compound (such as 1,4-benzoquinone, 2,5-toluquinone, 1,4-naphthoquinone, 2,3-dimethylbenzoquinone, 2,6-dimethylbenzoquinone, 2,3-dimethoxy-5-methyl-1,4-benzoquinone, 2,3-dimethoxy-1,4-benzoquinone, or phenyl-1,4-benzoquinone), diazophenylmethane or a phenol resin to an organic phosphine compound; a complex of an organic phosphine compound and an organic boron compound (such as tetraphenyl borate, tetra-p-tolyl borate, or tetra-n-butyl borate); a complex of an organic phosphine compound and a dicyanamide; a complex of an organic phosphine compound and a thiocyanate; and a complex of an organic phosphine compound and a calboxylate is preferable from the viewpoint of heat resistance.

Examples of the organic phosphine compound include triphenyl phosphine, diphenyl(p-tolyl)phosphine, tris(alkylphenyl)phosphine, tris(alkoxyphenyl)phosphine, tris(alkylalkoxyphenyl)phosphine, tris(dialkylphenyl)phosphine, tris(trialkylphenyl)phosphine, tris(tetraalkylphenyl)phosphine, tris(dialkoxyphenyl)phosphine, tris(trialkoxyphenyl) phosphine, tris(tetraalkoxyphenyl)phosphine, trialkyl phosphine, dialkyl aryl phosphine and alkyl diaryl phosphine.

An amount of the reaction catalyst is not particularly limited. The amount is preferably from 0.1% by mass to 1.5% by mass, and more preferably from 0.2% by mass to 1% by mass, with respect to the total mass of the epoxy resin represented by Formula (II) or the formula (II-1) and the specific divalent phenol compound from the viewpoint of reaction speed and storage stability.

In a case of small scale production, the partially prepolymerized epoxy resin may be synthesized using a glass flask. In a case of large scale production, the partially pre-polymerized epoxy resin may be synthesized using a stainless synthesis tank. A specific synthesis method is as follows, for example. First, the epoxy resin represented by Formula (II) or the formula (II-1) is charged into a flask or a synthesis tank, a synthesis solvent is put therein, and the resultant is heated to a reaction temperature using an oil bath or a heat medium, thereby melting the epoxy resin monomer. Then, the specific divalent phenol compound is charged thereto and confirmed to be uniformly molten in the synthesis solvent, thereafter the reaction catalyst is charged to start the reaction. The reaction solution is taken out after a lapse of a predetermined time, thereby obtaining an partially prepolymerized epoxy resin solution. Alternatively, the synthesis solvent is distilled off under the heating condition and under reduced pressure in the flask or the synthesis tank, whereby an partially prepolymerized epoxy resin is obtained as a solid at room temperature (for example 25° C.).

The reaction temperature is not limited as long as the reaction between an epoxy group and a phenolic hydroxyl group progresses in the presence of the reaction catalyst. The reaction temperature is, for example, preferably in a range from 100° C. to 180° C., and more preferably in a range from 120° C. to 170° C. In a case in which the reaction temperature is set at 100° C. or more, the period until the reaction is completed tends to be more shortened. In a case in which the reaction temperature is set at 180° C. or less, the possibility of gelation tends to be reduced.

The epoxy equivalent of the epoxy resin partially formed into a prepolymer is preferably from 130 g/eq to 500 g/eq, more preferably from 135 g/eq to 400 g/eq, and still more preferably from 140 g/eq to 300 g/eq. The epoxy equivalent is measured by a perchloric acid titration method in accordance with JIS K7236:2009.

A content of the epoxy resin having a mesogen structure in the epoxy resin molding material is not particularly limited, In a case in which a total volume of the solid content of the epoxy resin molding material is 100% by volume, the content of the epoxy resin having a mesogen structure is preferably from 5% by volume to 25% by volume, and more preferably from 10% by volume to 20% by volume from the viewpoint of heat conducting property and moldability.

The solid content of the epoxy resin molding material herein means the remaining component obtained by removing a volatile component from the epoxy resin molding material.

The epoxy resin molding material may contain, if necessary, other epoxy resin having no mesogen structure. Examples of such other epoxy resin include a bisphenol A type epoxy resin, a bisphenol F type epoxy resin, a bisphenol AD type epoxy resin, a hydrogenated bisphenol A type epoxy resin, a hydrogenated bisphenol AD type epoxy resin, a naphthalene type epoxy resin, and an epoxy resin having one epoxy group referred to as a reactive diluent.

A content of such other epoxy resin is not particularly limited as long as a molded product and a molded cured product made from the epoxy resin molding material have a higher-order structure. The content of such other epoxy resin is preferably 20 parts by mass or less, more preferably 15 parts by mass or less, and still more preferably 10 parts by mass or less with respect to 100 parts by mass of the epoxy resin having a mesogen structure.

—Phenolic Curing Agent—

The epoxy resin molding material contains at least one phenolic curing agent. Any phenolic curing agent commonly used can be used without any particular limitation. For example, a phenol compound, and a novolac phenol resin of a phenol compound can be used.

Examples of the phenol compound include monofunctional compounds such as phenol, o-cresol, m-cresol, and p-cresol; bifunctional compounds such as catechol, resorcinol, and hydroquinone; and trifunctional compounds such as 1,2,3-trihydroxybenzene, 1,2,4-trihydroxybenzene, and 1,3,5-trihydroxybenzene. A phenol novolac resin which is a novolac resin formed by linkage of the phenol compound with a methylene chain can be used as the phenol resin, and can also be used as the curing agent.

The phenolic curing agent is preferably a bifunctional phenol compound such as catechol, resorcinol, or hydroquinone, or a phenol novolac resin formed by linkage of a bifunctional phenol compound with a methylene chain, from the viewpoint of heat conducting property, and is more preferably a phenol novolac resin formed by linkage of a bifunctional phenol compound with a methylene chain from the viewpoint of heat resistance.

Examples of the phenol novolac resin can include novolac resins of one phenol compound, such as a cresol novolac resin, a catechol novolac resin, a resorcinol novolac resin, and a hydroquinone novolac resin; and novolac resins of two or more phenol compounds, such as a catechol resorcinol novolac resin and a resorcinol hydroquinone novolac resin.

In a case in which a phenol novolac resin is used as a phenolic curing agent, the phenol novolac resin preferably includes a compound having a structural unit represented by at least one selected from the group consisting of the following Formula (III-1) and the following Formula (III-2).

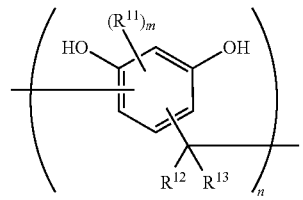

(III-1)

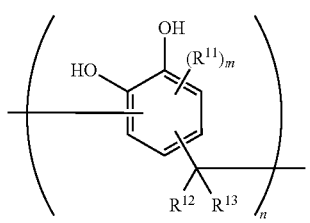

(III-2)

In Formulae (III-1) and (III-2), each $R^{11}$ independently represents an alkyl group, an aryl group or an aralkyl group. The alkyl group, the aryl group, and the aralkyl group represented by $R^{11}$ may further have a substituent. When $R^{11}$ is alkyl group, examples of the substituent include an aromatic group such as an aryl group, a halogen atom and a hydroxyl group. When $R^{11}$ is aryl group or aralkyl group, examples of the substituent include an alkyl group, an aromatic group such as an aryl group, a halogen atom and a hydroxyl group.

Each m independently represents an integer from 0 to 2, and when m represents 2, two $R^{11}$'s may be the same as or different from each other. Each m independently preferably represents 0 or 1, and more preferably 0.

n means a number of structure units represented by Formula (III-1) and the formula (III-2) included in a phenol novolac resin, and each n independently represents an integer from 1 to 7.

In Formulae (III-1) and (III-2), each of $R^{12}$ and $R^{13}$ independently represents a hydrogen atom, an alkyl group, an aryl group or an aralkyl group. The alkyl group, the aryl group, and the aralkyl group represented by each of $R^{12}$ and $R^{13}$ may further have a substituent. When $R^{12}$ and $R^{13}$ are alkyl group, examples of the substituent include an aromatic group such as an aryl group, a halogen atom and a hydroxyl group. When $R^{12}$ and $R^{13}$ are aryl group or aralkyl group, examples of the substituent include an alkyl group, an aromatic group such as an aryl group, a halogen atom and a hydroxyl group.

$R^{12}$ and $R^{13}$ in Formulae (III-1) and (III-2) each independently preferably represent a hydrogen atom, an alkyl group or an aryl group, more preferably a hydrogen atom, an alkyl group having 1 to 4 carbon atoms or an aryl group having 6 to 12, and still more preferably a hydrogen atom, from the viewpoints of storage stability and heat conductivity.

The compound having the structural unit derived from resorcinol represented by Formula (III-1) may further include at least one partial structure derived from a phenol compound other than resorcinol. The partial structure derived from the phenol compound other than resorcinol is preferably a partial structure derived from at least one selected from the group consisting of phenol, cresol, catechol, hydroquinone, 1,2,3-trihydroxybenzene, 1,2,4-trihydroxybenzene and 1,3,5-trihydroxybenzene, and more preferably a partial structure derived from at least one selected from the group consisting of catechol and hydroquinone, from the viewpoints of heat conductivity and adherence property.

The compound having the structural unit derived from catechol represented by Formula (III-2) may further include at least one partial structure derived from a phenol compound other than catechol. The partial structure derived from the phenol compound other than catechol is preferably a partial structure derived from at least one selected from the group consisting of phenol, cresol, resorcinol, hydroquinone, 1,2,3-trihydroxybenzene, 1,2,4-trihydroxybenzene and 1,3,5-trihydroxybenzene, and more preferably a partial structure derived from at least one selected from the group consisting of resorcinol and hydroquinone, from the viewpoints of heat conductivity and adherence property.

The partial structure derived from a phenol compound as used herein means a monovalent or divalent group formed by removing one or two hydrogen atoms from the benzene ring moiety of a phenol compound. The position(s) at which hydrogen atom(s) is/are removed is/are not particularly limited.

A content of the partial structure derived from resorcinol in the compound having the structural unit represented by Formula (III-1) is not particularly limited. The content of the partial structure derived from resorcinol with respect to the total mass of the compound having the structural unit represented by Formula (III-1) is preferably 55% by mass or more from the viewpoint of elastic modulus, more preferably 60% by mass or more, and still more preferably 80% by mass or more from the viewpoints of the glass transition temperature (Tg) and the linear expansion coefficient of a cured product, and is particularly preferably 90% by mass or more from the viewpoint of heat conductivity.

A content of the partial structure derived from catechol in the compound having the structural unit represented by Formula (III-2) is not particularly limited. The content of the partial structure derived from catechol with respect to the total mass of the compound having the structural unit represented by Formula (III-2) is preferably 55% by mass or more from the viewpoint of elastic modulus, more preferably 60% by mass or more, and still more preferably 80% by mass or more from the viewpoints of the glass transition temperature (Tg) and the linear expansion coefficient of a cured product, and is particularly preferably 90% by mass or more from the viewpoint of heat conductivity.

A molecular weight of the compound having a structural unit represented by at least one selected from the group consisting of Formulae (III-1) and (III-2) is not particularly limited. A number average molecular weight (Mn) thereof is preferably 2,000 or less, more preferably 1,500 or less, and still more preferably from 350 to 1,500, from the viewpoint of fluidity. A weight average molecular weight (Mw) is preferably 2,000 or less, more preferably 1,500 or less, and still more preferably from 400 to 1,500. The Mn and Mw are measured by a common method using gel permeation chromatography (GPC).

A hydroxyl equivalent of the compound having a structural unit represented by at least one selected from the group consisting of Formulae (III-1) and (III-2) is not particularly limited. An average of the hydroxyl equivalent is preferably from 50 g/eq to 150 g/eq, more preferably from 50 g/eq to 120 g/eq, and still more preferably from 55 g/eq to 120 g/eq, from the viewpoint of crosslinking density involved in heat resistance. The hydroxyl equivalent means a value measured according to JIS K 0070:1992.

In a case in which a compound having a structural unit represented by at least one selected from the group consisting of Formula (III-1) and Formula (III-2) is used as the phenolic curing agent, a proportion of the compound having a structural unit represented by at least one selected from the group consisting of Formula (III-1) and Formula (III-2), in the phenolic curing agent, is preferably 50% by mass or more, more preferably 80% by mass or more, and still more preferably 90% by mass or more.

In a case in which a phenol novolac resin is used as a phenolic curing agent, the phenol novolac resin preferably also includes a compound having a partial structure represented by at least one selected from the group consisting of the following Formula (IV-1) to the following Formula (IV-4).

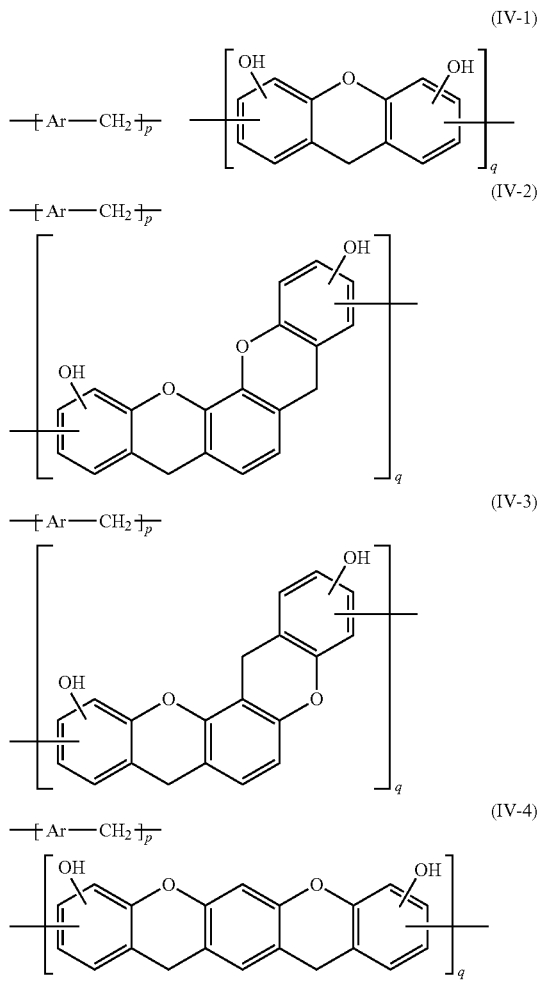

In Formulae (IV-1) to (IV-4), p and q each independently represent a positive integer, and mean a numbers of structural units marked with p and q, respectively. Each Ar independently represents a group represented by the following Formulae (IV-a) or (IV-b).

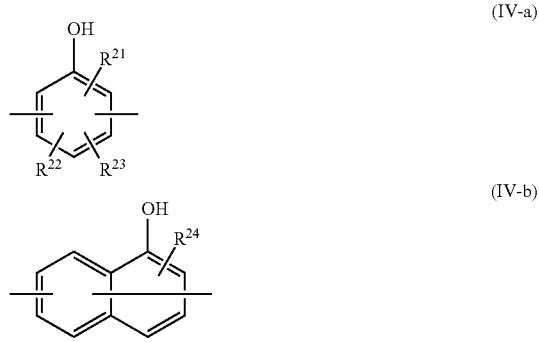

In Formulae (IV-a) and (IV-b), each of $R^{21}$ and $R^{24}$ independently represents a hydrogen atom or a hydroxyl group; and each of $R^{22}$ and $R^{23}$ independently represents a hydrogen atom, or an alkyl group having 1 to 8 carbon atoms.

The compound having a partial structure represented by at least one selected from the group consisting of Formulae (IV-1) to (IV-4) is a compound capable of being generated as a by-product by a method of producing a novolac compound of the divalent phenol compound.

The partial structure represented by at least one selected from the group consisting of Formulae (IV-1) to (IV-4) may be included as a main chain structure of the phenol novolac resin, or may be included as a part of a side chain of the phenol novolac resin. Respective structural units forming the partial structure represented by any one of Formulae (IV-1) to (IV-4) may be randomly included, may be regularly included, or may be included in a block manner.

A position of substitution with a hydroxyl group in Formulae (IV-1) to (IV-4) is not particularly limited as long as the position is on an aromatic ring.

All of the plurality of Ar's presented in each of Formulae (IV-1) to (IV-4) may be the same atom group, or the plurality of Ar's may include two or more atom groups. Each Ar represents a group represented by any one of Formulae (IV-a) and (IV-b).

Each of $R^{21}$ and $R^{24}$ in Formulae (IV-a) and (IV-b) independently represents a hydrogen atom or a hydroxyl group, and preferably represents a hydroxyl group from the viewpoint of heat conductivity. A position of substitution with each of $R^{21}$ and $R^{24}$ is not particularly limited.

Each of $R^{22}$ and $R^{23}$ in Formula (IV-a) independently represents a hydrogen atom, or an alkyl group having 1 to 8 carbon atoms. Examples of the alkyl group having 1 to 8 carbon atoms in $R^{22}$ or $R^{23}$ include a methyl group, an ethyl group, a n-propyl group, an isopropyl group, a n-butyl group, an isobutyl group, a t-butyl group, a pentyl group, a hexyl group, a heptyl group and an octyl group. A position of substitution with each of $R^{22}$ and $R^{23}$ in Formula (IV-a) is not particularly limited.

Ar in Formulae (IV-1) to (IV-4) preferably represents at least one selected from the group consisting of a group derived from dihydroxybenzene, the group in which $R^{21}$ represents a hydroxyl group and each of $R^{22}$ and $R^{23}$ represent a hydrogen atom in Formula (IV-a); and a group derived from dihydroxynaphthalene, the group in which $R^{24}$ in Formula (IV-b) represents a hydroxyl group; from the viewpoint of achieving a more superior heat conductivity.

The term "group derived from dihydroxybenzene" as used herein means a divalent group formed by removing two hydrogen atoms from the aromatic moiety of dihydroxybenzene, and the positions from which two hydrogen atoms are removed are not particularly limited. The same applies to the "group derived from dihydroxynaphthalene".

Ar more preferably represents a group derived from dihydroxybenzene, and still more preferably represents at least one selected from the group consisting of a group derived from 1,2-dihydroxybenzene (catechol) and a group derived from 1,3-dihydroxybenzene (resorcinol), from the viewpoints of productivity and fluidity of epoxy resin molding material. It is preferable that Ar includes at least a group derived from resorcinol from the viewpoint of particularly improving heat conductivity. It is preferable that the structural unit, which is a portion in which q is attached in Formulae (IV-1) to (IV-4), includes a group derived from resorcinol from the viewpoint of particularly improving heat conductivity.

In a case in which the compound having a partial structure represented by at least one selected from the group consisting of Formulae (IV-1) to (IV-4) includes a structural unit derived from resorcinol, a content of the structural unit derived from resorcinol with respect to the total weight of the compound having a structure represented by at least one selected from the group consisting of Formulae (IV-1) to (IV-4) is preferably 55% by mass or more, from the viewpoint of elastic modulus. The content is more preferably 60% by mass or more, and still more preferably 80% by mass or more, from the viewpoints of the glass transition temperature (Tg) and the linear expansion coefficient of a cured product, and is particularly preferably 90% by mass or more from the viewpoint of heat conductivity.

In Formulae (IV-1) to (IV-4), p and q preferably satisfy p/q=20/1 to ⅕, more preferably from 20/1 to 5/1, and still more preferably from 20/1 to 10/1, from the viewpoint of fluidity. Furthermore, (p+q) is preferably 20 or less, more preferably 15 or less, and still more preferably 10 or less, from the viewpoint of fluidity. The lower limit of (p+q) is not particularly limited.

In particular, in a case in which Ar represents at least one of substituted or unsubstituted dihydroxybenzene or substituted or unsubstituted dihydroxynaphthalene, the compound having a partial structure represented by at least one selected from the group consisting of Formulae (IV-1) to (IV-4) tends to be easily synthesized and tends to provide a curing agent having a lower softening point, as compared with a simple novolac resin or the like of such dihydroxybenzene or dihydroxynaphthalene. Accordingly, an advantage is that a resin composition including such a phenol resin as a curing agent is also easily produced and handled.

The presence of the partial structure represented by at least one selected from the group consisting of Formulae (IV-1) to (IV-4) in a phenol novolac resin may be identified by field desorption mass spectrometry (FD-MS), judging whether or not a component corresponding to the partial structure represented by at least one selected from the group consisting of Formulae (IV-1) to (IV-4) is included as a fragment element.

A molecular weight of the compound having a partial structure represented by at least one selected from the group consisting of Formulae (IV-1) to (IV-4) is not particularly limited. A number average molecular weight (Mn) thereof is preferably 2,000 or less, more preferably 1,500 or less, and still more preferably from 350 to 1,500, from the viewpoint of fluidity. A weight average molecular weight (Mw) thereof is preferably 2,000 or less, more preferably 1,500 or less, and still more preferably from 400 to 1,500. The Mn and Mw are measured by a common method using gel permeation chromatography (GPC).

A hydroxyl equivalent of the compound having a partial structure represented by at least one selected from the group consisting of Formulae (IV-1) to (IV-4) is not particularly limited. An average of the hydroxyl equivalent is preferably from 50 g/eq to 150 g/eq, more preferably from 50 g/eq to 120 g/eq, and still more preferably from 55 g/eq to 120 g/eq, from the viewpoint of crosslinking density involved in heat resistance.

In a case in which a compound having a partial structure represented by at least one selected from the group consisting of Formula (IV-1) to Formula (IV-4) is used as the phenolic curing agent, a proportion of the compound having a partial structure represented by at least one selected from the group consisting of Formula (IV-1) to Formula (IV-4), in the phenolic curing agent, is preferably 50% by mass or more, more preferably 80% by mass or more, and still more preferably 90% by mass or more.

In a case in which a compound having a structural unit represented by at least one selected from the group consisting of Formulae (III-1) to (III-2) or a compound having a partial structure represented by at least one selected from the group consisting of Formulae (IV-1) to (IV-4) is used as a phenol curing agent, the phenol curing agent may include a monomer which is a phenol compound that forms compound having a structural unit represented by at least one selected from the group consisting of Formulae (III-1) to (III-2) or a compound having a partial structure represented by at least one selected from the group consisting of Formulae (IV-1) to (IV-4). A content of the monomer as the phenol compound (hereinafter, also referred to as "monomer content") is not particularly limited. The monomer content in the phenol curing agent is preferably from 5% by mass to 80% by mass, more preferably from 15% by mass to 60% by mass, and still more preferably from 20% by mass to 50% by mass, from the viewpoints of heat conductivity and moldability.

In a case in which the monomer content is 80% by mass or less, the amount of a monomer not contributing to crosslinking in a curing reaction is decreased, and the amount of cross-linked high-molecular-weight product is increased, whereby a higher-order structure having a higher density is formed, and heat conductivity is improved. In a case in which the monomer content is 5% by mass or more, flowing during molding easily occurs and adhesiveness with the inorganic filler is more enhanced, whereby more superior heat conductivity and heat resistance are attained.

A content of the phenol curing agent is not particularly limited. For example, a ratio of a number of equivalents of active hydrogen of the phenolic hydroxyl group in the phenol curing agent (the number of equivalents of the phenolic hydroxyl group) and a number of equivalents of the epoxy group in the epoxy resin, that is, the ratio is the number of equivalents of the phenolic hydroxyl group/the number of equivalents of the epoxy group, is preferably from 0.5 to 2, and more preferably from 0.8 to 1.2.

—Inorganic Filler—

The epoxy resin molding material contains at least one inorganic filler. The inorganic filler is contained to thereby enhance heat conducting property of a cured product of the epoxy resin molding material. The inorganic filler preferably has insulation property. The term "insulation property" of the inorganic filler herein refers to the property of allowing no current to flow in the inorganic filler by itself even upon application of a voltage of about several volts to several thousand volts, and the property is achieved by a large energy gap with which the valence band having the highest energy level, occupied by an electron, is separated from the next band (conduction band) located thereabove.

Specific examples of a material of an insulating inorganic filler include boron nitride, alumina, silica, aluminum nitride, magnesium oxide, aluminum hydroxide, barium sulfate, or the like. Among them, at least one selected from the group consisting of magnesium oxide, alumina and aluminum nitride is preferable from the viewpoints of fluidity, heat conductivity, and electric insulation property. The inorganic filler may further contain boron nitride, silica or the like, as long as fluidity is not impaired.

The inorganic filler may have a single peak or a plurality of peaks in a particle size distribution curve depicted by plotting the particle diameter on the abscissa axis and the frequency on the ordinate axis. In a case in which an inorganic filler having a plurality of peaks in the particle size distribution curve depicted is used, fillability of the inorganic filler tends to improve and heat conductive property of a cured product tends to be improved.

In a case in which the inorganic filler has a single peak in the particle size distribution curve depicted, an average particle diameter (D50) corresponding to a particle diameter at 50% accumulated from the smaller particle diameter in the weight accumulation particle size distribution of the inorganic filler is preferably from 0.1 μm to 100 μm, and more preferably from 0.1 μm to 70 μm, from the viewpoint of heat conductivity. The average particle diameter of the inorganic filler may be measurement by a laser diffraction method may be carried out using a laser diffraction particle size analyzer (for example, LS230 manufactured by Beckman Coulter, Inc.).

The inorganic filler having a plurality of peaks in the particle size distribution curve, may be composed, for example, by using in combination of two or more inorganic fillers each having a different average particle size.

A content of an inorganic filler in the epoxy resin molding material is not particularly limited. The content of an inorganic filler is preferably from 60% by volume to 90% by volume, and more preferably from 70% by volume to 85% by volume, with respect to the total volume of the solid content of the epoxy resin molding material being 100% by volume, from the viewpoints of heat conductivity and moldability. In a case in which the content of an inorganic filler is 60% by volume or more, heat conductivity tends to be improved. Meanwhile, in a case in which the content of an inorganic filler is 90% by volume or less, moldability tends to be improved.

The content (% by volume) of an inorganic fillers in an epoxy resin molding material is determined by the following Formula.

Content (% by volume) of fillers={(Cw/Cd)/((Aw/Ad)+(Bw/Bd)+(Cw/Cd)+(Dw/Dd)+(Ew/Ed)+(Fw/Fd))}×100

Here, each variable is as follows.
Aw: mass composition ratio (% by mass) of epoxy resin
Bw: mass composition ratio (% by mass) of phenolic curing agent
Cw: mass composition ratio (% by mass) of inorganic fillers
Dw: mass composition ratio (% by mass) of curing accelerator
Ew: mass composition ratio (% by mass) of optional silane coupling agent
Fw: mass composition ratio (% by mass) of other optional components
Ad: specific gravity of epoxy resin
Bd: specific gravity of phenolic curing agent
Cd: specific gravity of inorganic fillers
Dd: specific gravity of curing accelerator
Ed: specific gravity of optional silane coupling agent
Fd: specific gravity of other optional components
—Curing Accelerator—

The epoxy resin molding material contains a curing accelerator having a quaternary phosphonium cation represented by the following Formula (I). The curing accelerator having the quaternary phosphonium cation represented by Formula (I) is high in reaction activity, and thus tends to be able to not only suppress curing inhibition, but also allow for curing without any breakage of the liquid crystallinity derived from the arrangement of the mesogen structure. As a result, high heat conducting property tends to be exerted after curing of the epoxy resin molding material.

In Formula (I), each of $R^a$ to $R^d$ independently represents an alkyl group having from 1 to 6 carbon atoms, or an aryl group. The alkyl group and the aryl group may have a substituent. In a case in which each of $R^a$ to $R^d$ represents an alkyl group, examples of a substituent include an alkoxy group, an aromatic group such as an aryl group, a halogen atom, and a hydroxyl group. In a case in which each of $R^a$ to $R^d$ represents an aryl group, examples of a substituent include an alkyl group, an alkoxy group, an aromatic group such as an aryl group, a diazo group, a halogen atom, and a hydroxyl group. In a case in which the substituent is a hydroxyl group, a proton may be released to form an anion, thereby resulting in intramolecular polarization.

Specific examples of the curing accelerator having the quaternary phosphonium cation represented by Formula (I) include a halogenated product of quaternary phosphonium; a compound having intramolecular polarization, obtained by adding a compound having a π-bond, such as maleic anhydride, a quinone compound (1,4-benzoquinone, 2,5-toluquinone, 1,4-naphthoquinone, 2,3-dimethylbenzoquinone, 2,6-dimethylbenzoquinone, 2,3-dimethoxy-5-methyl-1,4-benzoquinone, 2,3-dimethoxy-1,4-benzoquinone, phenyl-1,4-benzoquinone, or the like), diazophenylmethane, or a phenol resin, to an organic phosphine compound; a complex of an organic phosphine compound with an organic boron compound (tetraphenylborate, tetra-p-tolylborate, tetra-n-butylborate, or the like); a complex of an organic phosphine compound with dicyanamide; a complex of an organic phosphine compound with thiocyanate; and a complex of an organic phosphine compound with carboxylate. These may be used singly or in combination of two or more kinds thereof.

Specific examples of the halogenated product of quaternary phosphonium include chlorinated products and brominated products of quaternary phosphoniums such as tetraphenylphosphonium, tetraalkylphosphonium, tetra(alkylphenyl)phosphonium, alkyltriphenylphosphonium, alkoxyalkyltriphenylphosphonium, and benzyltriphenylphosphonium.

Specific examples of the organic phosphine compound include triphenylphosphine, diphenyl (p-tolyl)phosphine, tris(alkylphenyl)phosphine, tris(alkoxyphenyl)phosphine, tris(alkylalkoxyphenyl)phosphine, tris(dialkylphenyl)phosphine, tris(trialkylphenyl)phosphine, tris(tetraalkylphenyl)phosphine, tris(dialkoxyphenyl)phosphine, tris(trialkoxyphenyl)phosphine, tris(tetraalkoxyphenyl)phosphine, trialkylphosphine, and dialkylarylphosphine, and alkyldiarylphosphine.

The curing accelerator having the quaternary phosphonium cation represented by Formula (I) preferably includes at least one selected from the group consisting of a betaine type adduct of tri-n-butylphosphine and p-benzoquinone, a betaine type adduct of triphenylphosphine and p-benzoquinone, a betaine type adduct of tri-p-tolylphosphine and p-benzoquinone, tetraphenylphosphonium-tetra-p-tolylborate, and tetraphenylphosphonium-tetraphenylborate, from the viewpoint of an enhancement in heat conductivity.

A content of the curing accelerator having the quaternary phosphonium cation represented by Formula (I) in the epoxy resin molding material is not particularly limited. The content of the curing accelerator having the quaternary phosphonium cation represented by Formula (I) is preferably from 0.1 parts by mass to 2.0 parts by mass, more preferably from 0.5 parts by mass to 1.5 parts by mass with respect to 100 parts by mass of the epoxy resin having a mesogen structure, from the viewpoint of fluidity and moldability.

—Silane Coupling Agent—

The epoxy resin molding material may contain a silane coupling agent. In a case in which the epoxy resin molding material contains a silane coupling agent, a surface of the inorganic filler and an epoxy resin surrounding the inorganic filler interact with each other, whereby fluidity and heat conductivity tend to be improved, and ingress of water tends to be suppressed and insulation reliability tends to be thus improved.

A type of the silane coupling agent is not particularly limited. The silane coupling agent may be used singly, or in combination of two or more kinds thereof. In particular, a silane coupling agent having a phenyl group is preferable. The silane coupling agent having a phenyl group tends to easily interact with an epoxy resin having a mesogen structure. Therefore, an epoxy resin molding material which includes the silane coupling agent having a phenyl group is expected to impart a more superior heat conductivity of the cured product.

A type of the silane coupling agent containing a phenyl group is not particularly limited. Specific examples of the silane coupling agent containing a phenyl group include 3-phenylaminopropyltrimethoxysilane, 3-phenylaminopropyltriethoxysilane, N-methylanilinopropyltrimethoxysilane, N-methyl anilinopropyltriethoxysilane, 3-phenyliminopropyltrimethoxysilane, 3-phenyliminopropyltriethoxysilane, phenyltrimethoxysilane, phenyltriethoxysilane, diphenyldimethoxysilane, diphenyl diethoxysilane, triphenylmethoxysilane and triphenylethoxysilane. The silane coupling agent containing a phenyl group may be used singly, or in combination of two or more kinds thereof. A commercially available silane coupling agent may be used as the silane coupling agent containing a phenyl group.

A proportion of the silane coupling agent having a phenyl group in the entire silane coupling agent is preferably 50% by mass or more, more preferably 80% by mass or more, and still more preferably 90% by mass or more.

A silane coupling agent where a phenyl group is directly bound to a silicon atom (Si) is more preferably included from the viewpoint that a surface of the inorganic filler and the epoxy resin surrounding the surface are approached to each other to thereby impart excellent heat conductivity.

A proportion of the silane coupling agent where a phenyl group is directly bound to a silicon atom (Si), in the silane coupling agent having a phenyl group, is preferably 30% by mass or more, more preferably 50% by mass or more, and still more preferably 80% by mass or more.

In a case in which the epoxy resin molding material contains a silane coupling agent, the silane coupling agent may be present in the state of being attached to a surface of the inorganic filler, may be present in the state of not being attached to a surface of the inorganic filler, or may be present in a mixed state thereof.

In a case in which at least a part of the silane coupling agent is attached to a surface of the inorganic filler, an amount of attachment of a silicon atom derived from the silane coupling agent per specific surface area of the inorganic filler is preferably from $5.0\times10^{-6}$ mol/m$^2$ to $10.0\times10^{-6}$ mol/m$^2$, more preferably from $5.5\times10^{-6}$ mol/m$^2$ to $9.5\times10^{-6}$ mol/m$^2$, and still more preferably from $6.0\times10^{-6}$ mol/m$^2$ to $9.0\times10^{-6}$ mol/m$^2$.

The method for measuring the amount of covering with a silicon atom derived from the silane coupling agent per specific surface area of the inorganic filler is as follows.

First, a BET method is mainly applied as the method for measuring the specific surface area of the inorganic filler. The BET method is a gas adsorption method including allowing an inert gas molecule such as nitrogen ($N_2$), argon (Ar), or krypton (Kr) to adsorb to a solid particle, and measuring the specific surface area of the solid particle from the amount of the molecule for adsorption. The specific surface area is measured with a specific surface area pore size distribution measurement apparatus (for example, SA3100 manufactured by Beckman Coulter, Inc.).

The amount of a silicon atom derived from the silane coupling agent present in a surface of the inorganic filler is quantitatively determined. Examples of the quantitative determination method include $^{29}$Si CP/MAS (Cross-Polarization/Magic angle spinning) solid state NMR (nuclear magnetic resonance). A nuclear magnetic resonance apparatus (for example, JNM-ECA700 manufactured by JEOL Ltd.) has a high resolution, and therefore can distinguish a silicon atom derived from silica as the inorganic filler from a silicon atom derived from the silane coupling agent even in a case in which the epoxy resin molding material includes silica as the inorganic filler.

In a case in which the epoxy resin molding material does not include a silicon atom other than a silicon atom derived from the silane coupling agent, the amount of a silicon atom derived from the silane coupling agent can also be quantitatively determined with an X-ray fluorescence spectrometer (for example, Supermini 200 manufactured by Rigaku Corporation).

The amount of covering with a silicon atom derived from the silane coupling agent per specific surface area of the inorganic filler is calculated based on the specific surface area of the inorganic filler and the amount of the silicon atom derived from the silane coupling agent present in a surface of the inorganic filler, obtained as described above.

The inorganic filler included in the epoxy resin molding material can be taken out from the epoxy resin molding material according to a method exemplified below, upon the measurement.

(1) An epoxy resin molding material is placed in a porcelain crucible, and heated in a muffle furnace (for example, 600° C.) to burn a resin component.

(2) The resin component of the epoxy resin molding material is dissolved in a proper solvent, and the inorganic filler is recovered by filtration and dried.

In a case in which an epoxy resin molding material includes the silane coupling agent, the method of adding the silane coupling agent to the epoxy resin molding material is not particularly limited. Specific addition methods include an integral method in which a silane coupling agent is added during mixing of other materials such as the epoxy resin and the inorganic filler; a master batch method in which a predetermined amount of the silane coupling agent is mixed with a small amount of the epoxy resin, and thereafter the resulting mixture is mixed with other materials such as the inorganic filler; and a pretreatment method in which the silane coupling agent is mixed with the inorganic filler in advance, to treat the surface of the inorganic filler, and thereafter the resultant is mixed with other materials such as the epoxy resin. The pretreatment method is classified into: a dry method in which an undiluted solution or a solution of the silane coupling agent is stirred together with the inorganic filler at a high speed; and a wet method in which the surface of the inorganic filler is treated by forming a slurry including the inorganic filler and a diluted solution of the silane coupling agent, or directly immersing the inorganic filler in a solution of the silane coupling agent.

—Other Components—

The epoxy resin molding material may contain not only components described above but also other components. Other components include a release agent such as an oxidized or non-oxidized polyolefin, carnauba wax, a montanic acid ester, montanic acid and stearic acid; a stress releaser such as silicone oil or a silicone rubber powder; a reinforcing agent such as glass fiber; or the like. Other components may be used singly, or in combination of two or more kinds thereof.

<Method of Producing Epoxy Resin Molding Material>

The method of producing the epoxy resin molding material is not particularly limited. As a general method, a method is employed in which predetermined amounts of components are satisfactory mixed using a mixer or the like, thereafter melt-kneaded, followed by cooling and pulverizing. Melt-kneaded may be conducted using a kneader, a roll, an extruder or the like heated to a temperature of from 70° C. to 140° C. in advance. The epoxy resin molding material is easily used which is formed into a tablet so as to have a dimension and a mass adapted to molding conditions.

<State of Epoxy Resin Molding Material>

The epoxy resin molding material is preferably in an A-stage state. In a case in which the epoxy resin molding material is in an A-stage state, the amount of reaction heat generated in a curing reaction between the epoxy resin and the curing agent is large and the curing reaction easily progresses in curing of the epoxy resin molding material by a heat treatment, as compared with a case in which the epoxy resin molding material is in a B-stage state. The definitions of the terms "A-stage" and "B-stage" are according to JIS K 6800:1985.

Whether or not the epoxy resin molding material is in an A-stage state is determined according to the following criteria.

A certain amount of the epoxy resin molding material is loaded into an organic solvent (tetrahydrofuran, acetone, or the like) which can dissolve the epoxy resin included in the epoxy resin molding material, and the inorganic filler and the like remaining after a lapse of a certain period is separated by filtration. In a case in which the difference between a mass after drying of the residue obtained with separation by filtration and a mass of the ash after a high-temperature treatment is within ±0.5% by mass, it is determined that the epoxy resin molding material is in an A-stage state. The mass of the ash is measured and calculated according to the prescription of JIS K 7250-1:2006.

Alternatively, the reaction heat based on a certain mass of the epoxy resin molding material determined in advance to be in an A-stage state is measured by a differential scanning calorimetric measurement apparatus (DSC, for example, Pyris 1 manufactured by PerkinElmer Co., Ltd.), and is defined as a standard value. In a case in which the difference between a measurement value of the reaction heat based on a certain mass of the epoxy resin molding material prepared and the standard value is within ±5%, it is determined that the epoxy resin molding material is in an A-stage state.

In a case in which the epoxy resin molding material is in an A-stage state, a mass reduction rate after heating of the epoxy resin molding material in an A-stage state at 180° C. for 1 hour is preferably 0.1% by mass or less. The mass reduction rate after heating of the epoxy resin molding material in an A-stage state at 180° C. for 1 hour, of 0.1% by mass or less, means that the epoxy resin molding material in an A-stage state is a so-called "solvent-free" type epoxy resin molding material. In a case in which the epoxy resin molding material is of a solvent-free type, a molded product made from the epoxy resin molding material can be obtained without any drying step, thereby allowing a step of obtaining a molded product or a molded cured product to be simplified.

<Molded Product and Molded Cured Product>

A molded product in the present embodiment is produced by molding the epoxy resin molding material in the present embodiment. A molded cured product in the present embodiment is produced by heat-treating (post-curing) the molded product in the present embodiment.

The method of molding the epoxy resin molding material is not particularly limited, and can be selected from known press molding methods depending on the intended use and the like. The press molding method may be a transfer molding method most commonly adopted, or may be a compression molding method.

The mold temperature in press molding is not particularly limited. In a case in which the phase transition temperature of the epoxy resin having a mesogen structure contained in the epoxy resin molding material is 140° C. or less, the mold temperature in press molding is preferably the phase transition temperature of the epoxy resin having a mesogen structure or more, and 150° C. or less, more preferably 140° C. or less. In a case in which the phase transition temperature is equal to or more than the phase transition temperature of the epoxy resin having a mesogen structure, the epoxy resin is sufficiently molten in molding and thus easily molded, and in a case in which the phase transition temperature is 150° C. or less, the molded product tends to be excellent in heat conductivity.

A common mold temperature in press molding is from 150° C. to 180° C. from the viewpoint of fluidity, and a common epoxy resin having a mesogen structure is hardly molten at a mold temperature of 150° C. or less and thus tends to be difficult to mold at the temperature. For example, however, the phase transition temperature of the epoxy resin having a mesogen structure, formed into a prepolymer, can fall to 140° C. or less, and such an epoxy resin can be molded even at 150° C. or less.

The cured product has preferably a diffraction peak in a diffraction angle 2θ range of from 3.0° to 3.5° in an X-ray diffraction spectrum obtained by an X-ray diffraction method using CuKα rays. A cured product having such a diffraction peak has smectic structure which is especially well-ordered among higher-order structures, thereby being excellent in heat conductivity.

A detail of the X-ray diffraction measurement using CuKα rays as used herein is as follows.

[Measurement Conditions]

Apparatus used: X-ray diffractometer for thin film structure evaluation, ATX-G (manufactured by Rigaku Corporation)

Type of X-ray: CuKα
Scanning mode: 2θ/ω
Output: 50 kV, 300 mA
S1 slit: width: 0.2 mm, height: 10 mm
S2 slit: width: 0.2 mm, height: 10 mm
RS slit: width: 0.2 mm, height: 10 mm
Measurement range: 2θ=2.0° to 4.5°
Sampling width: 0.01°

After the epoxy resin molding material is molded, a molded product released from the mold may be used as it is, or may be, if necessary, post-cured by heating in an oven or the like, and then used.

A molded cured product is obtained by post-curing the molded product by heating or the like. A heating conditions of the molded product can be appropriately selected depending on types and amounts of the epoxy resin, the curing agent and the like contained in the epoxy resin molding material. For example, a heating temperature applied the molded product is preferably from 130° C. to 200° C., and more preferably from 150° C. to 180° C. The heating time applied the molded product is preferably from 1 hour to 10 hours, and more preferably from 2 hours to 6 hours.

The molded cured product preferably has a diffraction peak in a diffraction angle 2θ range of from 3.0° to 3.5° in an X-ray diffraction spectrum obtained by an X-ray diffraction method using CuKα rays, as in the molded product before post-curing. In a case in which a smectic structure high in ordering property is formed in the molded product, such a smectic structure can be maintained even after post-curing by heating, to thereby provide a molded cured product excellent in heat conducting property.

The molded product and the molded cured product in the present embodiment can be used not only for motors and inverters for industries and automobiles, but also in the fields of printed-wiring boards, sealing materials for semiconductor devices, and the like.

EXAMPLES

Hereinafter, the invention will be described in detail with reference to Examples, but a scope of the present invention is not intended to be limited to these Examples.

<Preparation of Epoxy Resin Molding Material>

The following components were each compounded in parts by mass shown in Table 1 and Table 2 below, and roll kneading was performed in conditions of a kneading temperature of 80° C. and a kneading time of 10 minutes, to prepare an epoxy resin molding material of each of Examples 1 to 5 and Comparative Examples 1 to 5. The blank columns in the Tables mean no compounding.

The epoxy resin molding material of each of Examples 1 to 5 and Comparative Examples 1 to 5 was in an A-stage state.

The epoxy resin molding material of each of Examples 1 to 5 and Comparative Examples 1 to 5 was heated at 180° C. for 1 hour, and it was thus found that the mass reduction rate was 0.1% by mass or less.

Raw materials and the abbreviations thereof are shown below.

[Epoxy Resin]

Epoxy Resin 1

Compound obtained by reaction of trans-4-{4-(2,3-epoxypropoxy)phenyl}cyclohexyl=4-(2,3-epoxypropoxy)benzoate (epoxy resin represented by the following Formula (II-2), see JP-B No. 5471975, epoxy equivalent: 212 g/eq) with hydroquinone in an amount so that the ratio (Ep/Ph) of the epoxy group equivalent (Ep) to the phenolic hydroxyl group equivalent (Ph) was 100/15, and prepolymer formation of a part of the resulting reaction product The synthesis method of epoxy resin 1 will be described below.

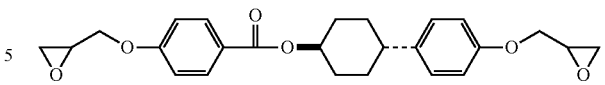

(II-2)

Epoxy Resin 2

YSLV-80XY having no mesogen structure (bisphenol F type epoxy resin, manufacture by NIPPON STEEL & SUMIKIN CHEMICAL CO., LTD., epoxy equivalent: 195 g/eq, isotropically cured with no liquid crystal phase being exhibited)

[Phenolic Curing Agent]

CRN (catechol resorcinol novolac resin, loading mass ratio (C/R) of catechol (C) to resorcinol (R): 5/95)

The synthesis method of CRN will be described below.

[Inorganic Filler]

AL35-63 (alumina, manufactured by NIPPON STEEL & SUMIKIN MATERIALS Co., Ltd., average particle size: 35 specific surface area: 0.1 m²/g)

AL35-45 (alumina, manufactured by NIPPON STEEL & SUMIKIN MATERIALS Co., Ltd., average particle size: 25 specific surface area: 0.2 m²/g)

AX3-32 (alumina, manufactured by NIPPON STEEL & SUMIKIN MATERIALS Co., Ltd., average particle size: 4 specific surface area: 1 m²/g)

[Silane Coupling Agent]

KBM-573 (3-phenylaminopropyltrimethoxysilane, manufactured by Shin-Etsu Chemical Co., Ltd., molecular weight: 255)

KBM-202SS (diphenyldimethoxysilane, manufactured by Shin-Etsu Chemical Co., Ltd., molecular weight: 244)

[Curing Accelerator]

Curing accelerator 1: betaine type adduct of tri-n-butylphosphine and p-benzoquinone

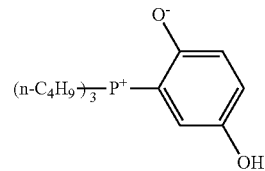

Curing accelerator 2: betaine type adduct of triphenylphosphine and p-benzoquinone

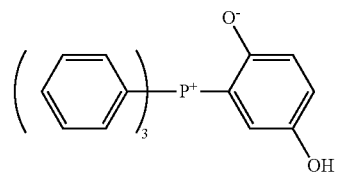

Curing accelerator 3: tetraphenylphosphonium-tetra-p-tolylborate

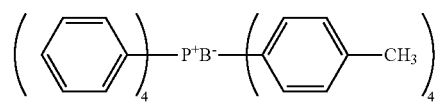

Curing accelerator 4: triphenylphosphine

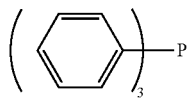

Curing accelerator 5: 2-ethyl-4-methylimidazole

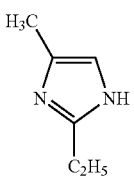

[Release Agent]

Montanic acid ester (Licowax E, manufactured by Clariant Japan K.K.)

(Synthesis (Prepolymer Formation) of Epoxy Resin 1)

Fifty g (0.118 mol) of the epoxy resin represented by Formula (II-2) was weighed in a 500-mL three-neck flask, and 80 g of propylene glycol monomethyl ether as a solvent was added thereto. The three-neck flask was equipped with a cooling tube and a nitrogen introduction tube, and a stirring blade was installed so as to be immersed in the solvent. The three-neck flask was immersed in an oil bath at 120° C., and stirring was initiated. After it was confirmed that the epoxy resin represented by Formula (II-2) was dissolved to form a clear solution after several minutes, 1.95 g (0.0177 mol) of hydroquinone was added and also 0.5 g of triphenylphosphine was added, and heating was continued at an oil bath temperature of 120° C. After heating was continued for 5 hours, the propylene glycol monomethyl ether was distilled off from the reaction solution under reduced pressure, and the residue was cooled to room temperature (25° C.), thereby obtaining epoxy resin 1.

A solid fraction of epoxy resin 1 was measured according to a loss-on-heating method. The solid fraction was here calculated according to the following expression based on the amount measured after weighing from 1.0 g to 1.1 g of a sample in an aluminum cup and leaving the sample to stand in a dryer set at a temperature of 180° C. for 30 minutes, and the amount measured before such heating. As a result, the solid fraction of epoxy resin 1 was 99.5%.

Solid fraction (%)=(Amount measured after standing for 30 minutes/Amount measured before heating)×100

A number average molecular weight of epoxy resin 1 was measured by gel permeation chromatography (GPC). Such measurement was performed using high performance liquid chromatography L 6000 manufactured by Hitachi, Ltd. and Data Analyzer C-R4A manufactured by Shimadzu Corporation. GPC columns for analysis here used were G2000HXL and 3000HXL manufactured by TOSOH CORPORATION. Such measurement was performed in a sample concentration of 0.2% by mass and at a flow rate of 1.0 mL/min with tetrahydrofuran for a mobile phase. A calibration curve was created using a polystyrene standard sample, and was used to calculate the number average molecular weight in terms of polystyrene. As a result, the number average molecular weight of epoxy resin 1 was 624.

A epoxy equivalent of epoxy resin 1 was measured according to a perchloric acid titration method, and as a result, was 275 g/eq.

A phase transition temperature of epoxy resin 1 was measured with a differential scanning calorimetric (DSC) measurement apparatus (Pyris 1 manufactured by PerkinElmer Co., Ltd.). DSC measurement of from 3 mg to 5 mg of a sample enclosed in an aluminum pan was performed in conditions of a rate of temperature rise of 20° C./min, a measurement temperature range of from 25° C. to 350° C., a flow rate of 20±5 mL/min, and a nitrogen atmosphere, and the temperature at which the change in energy along with phase transition occurred (peak temperature of endothermic reaction) was defined as the phase transition temperature. As a result, the phase transition temperature of epoxy resin 1 was 130° C.

(Synthesis of CRN)

A 3-L separable flask equipped with a stirrer, a condenser, and a thermometer was charged with 627 g of resorcinol, 33 g of catechol, 316.2 g of an aqueous 37% by mass formaldehyde solution, 15 g of oxalic acid, and 300 g of water, and the temperature was raised to 100° C. with warming in an oil bath. Reflux was made at about 104° C., and the reflux temperature was kept for 4 hours. Thereafter, the temperature in the flask was raised to 170° C. with water being distilled off, and kept at 170° C. for 8 hours. After the reaction, concentration under reduced pressure was performed for 20 minutes, to remove water in the system, thereby obtaining a phenol resin (CRN).

A structure of the resulting CRN was confirmed by FD-MS, and the presence of all partial structures represented by Formula (IV-1) to Formula (IV-4) could be confirmed.

It is herein considered that a compound having a partial structure represented by Formula (IV-1) is first generated in the above reaction conditions and the compound is further subjected to a dehydration reaction to thereby generate a compound having a partial structure represented by at least one of Formula (IV-2) to Formula (IV-4).

A number average molecular weight and a weight average molecular weight of the resulting CRN were measured by GPC. Such measurement was performed using high performance liquid chromatography L 6000 manufactured by Hitachi, Ltd. and Data Analyzer C-R4A manufactured by Shimadzu Corporation. GPC columns for analysis here used were G2000HXL and 3000HXL manufactured by TOSOH CORPORATION. Such measurement was performed in a sample concentration of 0.2% by mass and at a flow rate of 1.0 mL/min with tetrahydrofuran for a mobile phase. A calibration curve was created using a polystyrene standard sample, and was used to calculate the number average molecular weight and the weight average molecular weight in terms of polystyrene.

A hydroxyl group equivalent of the resulting CRN was measured as follows.

The hydroxyl group equivalent was measured according to an acetyl chloride-potassium hydroxide titration method. The end point of titration was here determined according to not a staining method with an indicator, but a potentiometric titration, because the color of the solution was a dark color. Specifically, a hydroxyl group of a measurement resin was converted into an acetyl chloride group in a pyridine solution, thereafter an excess of a reagent was decomposed by water, and the acetic acid generated was titrated with a potassium hydroxide/methanol solution.

The resulting CRN was a mixture of compounds having partial structures represented by one or more of Formula (IV-1) to Formula (IV-4), and was a phenol resin (hydroxyl group equivalent: 65 g/eq, number average molecular weight: 422, weight average molecular weight: 564) including 35% by mass of a monomer component (resorcinol) as a low molecular diluent, in which Ar corresponded to a group derived from 1,2-dihydroxybenzene (catechol) and a group derived from 1,3-dihydroxybenzene (resorcinol) where $R^{21}$ represented a hydroxyl group, and each of $R^{22}$ and $R^{23}$ represented a hydrogen atom in Formula (IV-a).

(Measurement of Amount of Attachment of Silicon Atom Derived from Silane Coupling Agent)

A epoxy resin molding material of each of Examples 1 to 5 and Comparative Examples 1 to 5 was subjected to measurement of the amount of attachment of a silicon atom derived from the silane coupling agent per specific surface area of the inorganic filler.

First, a specific surface area of the inorganic filler was determined according to a BET method with a specific surface area pore size distribution measurement apparatus (SA3100 manufactured by Beckman Coulter, Inc.). Next, an amount of a silicon atom derived from the silane coupling agent present in a surface of the inorganic filler was quantitatively determined with a nuclear magnetic resonance apparatus (JNM-ECA700 manufactured by JEOL Ltd.) according to a $^{29}$Si CP/MAS solid state NMR. The amount of attachment of a silicon atom derived from the silane coupling agent per specific surface area of the inorganic filler was calculated from the resulting values. The inorganic filler was taken out by placing the epoxy resin molding material in a porcelain crucible, and heating it in a muffle furnace at 600° C. to burn a resin component.

(Production of Molded Product and Molded Cured Product)

The epoxy resin molding material of each of Examples 1 to 5 and Comparative Examples 1 to 5 was molded by a transfer molding machine in conditions of a molding pressure of 20 MPa and a molding temperature of 150° C., thereby obtaining a molded product. The resulting molded product was post-cured in conditions of 180° C. and 5 hours, thereby obtaining a molded cured product.

(Measurement of Distance of Flow)

The spiral flow was measured as an index representing the fluidity of the epoxy resin molding material in molding. The measurement method included determining the distance of flow (cm) by using a mold for spiral flow measurement in accordance with EMMI-1-66, to mold the epoxy resin molding material in the above conditions.

(Measurement of Glass Transition Temperature (Tg))

The molded cured product was cut to form a cuboid of 5 mm×50 mm×3 mm, and the dynamic viscoelasticity was measured in a temperature range of from 40° C. to 300° C. in conditions of a frequency of 1 Hz and a rate of temperature rise of 5° C./min with a three point bending vibration test jig in a dynamic viscoelasticity measurement apparatus (RSA-G2 manufactured by TA Instruments). The glass transition temperature (Tg) was defined as the temperature of a peak top portion with respect to tan δ determined from the ratio of the storage elastic modulus to the loss elastic modulus obtained in the above method.

(Measurement of Density)

The molded cured product was cut to form a 10 mm cube, and the density (g/cm$^3$) was measured according to the Archimedes method.

(Measurement of Heat Conductivity)

The molded cured product was cut to form a 10 mm cube, and the cube was subjected to a blackening treatment by a graphite spray. Thereafter, the thermal diffusivity was evaluated according to the xenon flash method (LFA447 nanoflash manufactured by NETZSCH). The heat conductivity of the molded product or the molded cured product was determined from the thermal diffusivity value, and the product of the density measured according to the Archimedes method and the specific heat measured with DSC (Pyris 1 manufactured by PerkinElmer Co., Ltd.).

(X-Ray Diffraction Method)

The molded product or the molded cured product was subjected to X-ray diffraction measurement with a wide angle X-ray diffractometer (ATX-G manufactured by Rigaku Corporation). CuKα rays were used in an X-ray source, the tube voltage was 50 kV, the tube current was 300 mA, and the scanning rate was 1.0°/min. The occurrence of a diffraction peak in a diffraction angle 2θ range of from 3.0° to 3.5° indicates that a smectic structure is formed in the molded product or the molded cured product.

(Evaluation Results)

The above evaluation results were described in Table 1 and Table 2. The unit with respect to each raw material is part(s) by mass.

TABLE 1

| Item | | Example 1 | Example 2 | Example 3 | Example 4 | Example 5 |
|---|---|---|---|---|---|---|
| Epoxy resin | Epoxy resin 1 | 5.41 | 5.41 | 5.37 | 5.41 | 5.41 |
| Curing agent | CRN | 1.30 | 1.30 | 1.29 | 1.30 | 1.30 |
| Curing accelerator | Curing accelerator 1 | 0.03 | 0.03 | 0.08 | | |
| | Curing accelerator 2 | | | | 0.03 | |
| | Curing accelerator 3 | | | | | 0.03 |
| Silane coupling agent | KBM-573 | 0.07 | | 0.07 | 0.07 | 0.07 |
| | KBM-202SS | | 0.07 | | | |
| Release agent | Montanic acid ester | 1.00 | 1.00 | 1.00 | 1.00 | 1.00 |
| Inorganic filler | AL35-63 | 58.67 | 58.67 | 58.67 | 58.67 | 58.67 |
| | AL35-45 | 16.76 | 16.76 | 16.76 | 16.76 | 16.76 |
| | AX3-32 | 16.76 | 16.76 | 16.76 | 16.76 | 16.76 |
| Content of inorganic filler (% by volume) | | 78 | 78 | 78 | 78 | 78 |
| Amount of attachment of silicon atom derived from silane coupling agent (×10$^{-6}$ mol/m$^2$) | | 8.9 | 9.3 | 8.9 | 8.9 | 8.9 |
| Molding temperature (° C.) | | 150 | 150 | 150 | 150 | 150 |
| Flow distance (cm) | | 85 | 87 | 82 | 88 | 86 |
| Post-curing temperature (° C.) | | 180 | 180 | 180 | 180 | 180 |
| Property of Molded product or Molded cured product | Tg (° C.) | 180 | 180 | 185 | 180 | 180 |
| | Density (g/cm$^3$) | 3.27 | 3.27 | 3.27 | 3.27 | 3.27 |
| | Heat conductivity (W/(m · K)) | 11.2 | 11.4 | 11.6 | 11.0 | 11.0 |

TABLE 1-continued

| Item | | Example 1 | Example 2 | Example 3 | Example 4 | Example 5 |
|---|---|---|---|---|---|---|
| Present or absent of smectic structure (X ray diffraction) | | Present | Present | Present | Present | Present |

TABLE 2

| Item | | Comparative Example 1 | Comparative Example 2 | Comparative Example 3 | Comparative Example 4 | Comparative Example 5 |
|---|---|---|---|---|---|---|
| Epoxy resin | Epoxy resin 1 | 5.41 | 5.37 | 5.37 | | |
| | Epoxy resin 2 | | | | 5.02 | 5.02 |
| Curing agent | CRN | 1.30 | 1.29 | 1.29 | 1.71 | 1.71 |
| Curing accelerator | Curing accelerator 1 | | | | 0.03 | |
| | Curing accelerator 4 | 0.03 | 0.08 | | 0.03 | 0.03 |
| | Curing accelerator 5 | | | 0.08 | | |
| Silane coupling agent | KBM-573 | 0.07 | 0.07 | 0.07 | 0.07 | 0.07 |
| Release agent | Montanic acid ester | 1.00 | 1.00 | 1.00 | 1.00 | 1.00 |
| Inorganic filler | AL35-63 | 58.67 | 58.67 | 58.67 | 58.67 | 58.67 |
| | AL35-45 | 16.76 | 16.76 | 16.76 | 16.76 | 16.76 |
| | AX3-32 | 16.76 | 16.76 | 16.76 | 16.76 | 16.76 |
| Content of inorganic filler (% by volume) | | 78 | 78 | 78 | 78 | 78 |
| Amount of attachment of silicon atom derived from silane coupling agent ($\times 10^{-6}$ mol/m$^2$) | | 8.9 | 8.9 | 8.9 | 8.9 | 8.9 |
| Molding temperature (° C.) | | 150 | 150 | 150 | 150 | 150 |
| Flow distance (cm) | | 80 | 76 | 82 | 89 | 100 |
| Post-curing temperature (° C.) | | 180 | 180 | 180 | 180 | 180 |
| Property of molded product or molded cured product | Tg (° C.) | 170 | 173 | 166 | 150 | 145 |
| | Density (g/cm$^3$) | 3.20 | 3.20 | 3.18 | 3.27 | 3.27 |
| | Heat conductivity (W/(m·K)) | 9.1 | 9.1 | 8.8 | 7.8 | 7.8 |
| | Present or Absent of smectic structure (X ray diffraction) | Present | Present | Present | Absent | Absent |

As clear from Table 1 and Table 2, the heat conductivity was increased by from about 2 W/(m·K) to 3 W/(m·K) in Examples 1 to 5 in which the epoxy resin molding material containing the epoxy resin having a mesogen structure and the curing accelerator having a quaternary phosphonium cation was used, as compared with Comparative Examples 1 to 3 in which the epoxy resin molding material not containing any curing accelerator having a quaternary phosphonium cation was used, Comparative Example 4 in which the epoxy resin molding material not containing any epoxy resin having a mesogen structure was used, and Comparative Example 5 in which the epoxy resin molding material not containing both of such a curing accelerator and such an epoxy resin was used. In particular, each of Comparative Examples 1 to 3 exhibited a lower heat conductivity than Examples 1 to 5, although the occurrence of a diffraction peak in a diffraction angle 2θ range of from 3.0° to 3.5° according to an X-ray diffraction method with CuKα rays and formation of a smectic structure were confirmed. This indicates that use of the curing accelerator having a quaternary phosphonium cation not only suppresses curing inhibition which can be caused in the case of use of any curing accelerator other than such a curing accelerator, but also allows the effect of curing to be exerted without any breakage of the liquid crystallinity based on the arrangement of the mesogen structure.

The entire contents of the disclosures by Japanese Patent Application No. 2016-034888 filed on Feb. 25, 2016 are incorporated herein by reference.

All the literature, patent application, and technical standards cited herein are also herein incorporated to the same extent as provided for specifically and severally with respect to an individual literature, patent application, and technical standard to the effect that the same should be so incorporated by reference.

The invention claimed is:

1. An epoxy resin molding material comprising:
   an epoxy resin having a mesogen structure,
   a phenolic curing agent,
   an inorganic filler, and
   a curing accelerator having a quaternary phosphonium cation represented by the following Formula (I):

wherein, in Formula (I), each of $R^a$ to $R^d$ independently represents an alkyl group having from 1 to 6 carbon atoms, or an aryl group, and the alkyl group and the aryl group may have a substituent,
   wherein the epoxy resin having a mesogen structure comprises an epoxy resin represented by the following Formula (II):

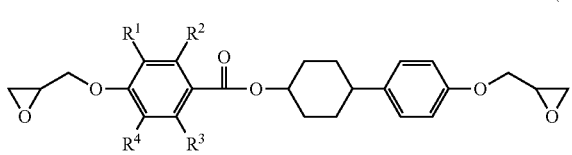

(II)

wherein, in Formula (II), each of $R^1$ to $R^4$ independently represents a hydrogen atom, or an alkyl group having from 1 to 3 carbon atoms, wherein the epoxy resin having a mesogen structure comprises a reaction product of a divalent phenol compound having two hydroxyl groups on one benzene ring, with the epoxy resin represented by Formula (H), the divalent phenol compound comprises hydroquinone, and the reaction product has an epoxy equivalent ranging from 135 q/eq to 400 q/eq.

2. The epoxy resin molding material according to claim 1, wherein a content of the curing accelerator is from 0.1 parts by mass to 2.0 parts by mass with respect to 100 parts by mass of the epoxy resin having a mesogen structure.

3. The epoxy resin molding material according to claim 1, wherein the epoxy resin having a mesogen structure comprises the reaction product in which a ratio of the epoxy group equivalent of the epoxy resin represented by Formula (II) to the phenolic hydroxyl group equivalent of the divalent phenol compound (epoxy group equivalent/phenolic hydroxyl group equivalent) is from 100/10 to 100/20.

4. The epoxy resin molding material according to claim 1, wherein the phenolic curing agent comprises a compound having a structural unit represented by at least one selected from the group consisting of the following Formula (III-1) and the following Formula (III-2):

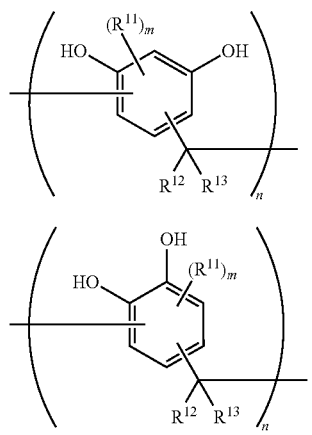

wherein, in Formula (III-1) and Formula (III-2), each $R^{11}$ independently represents an alkyl group, an aryl group, or an aralkyl group, wherein the alkyl group, the aryl group, and the aralkyl group may have a substituent; each of $R^{12}$ and $R^{13}$ independently represents a hydrogen atom, an alkyl group, an aryl group, or an aralkyl group, wherein the alkyl group, the aryl group, and the aralkyl group may have a substituent; each m independently represents an integer from 0 to 2; and each n independently represents an integer from 1 to 7.

5. The epoxy resin molding material according to claim 1, wherein the phenolic curing agent comprises a compound having a partial structure represented by at least one selected from the group consisting of the following Formula (IV-1) to the following Formula (IV-4):

(IV-1)
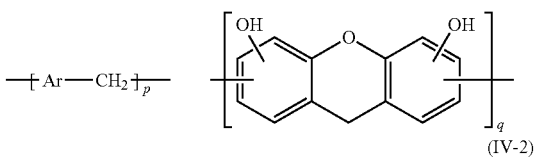

(IV-2)
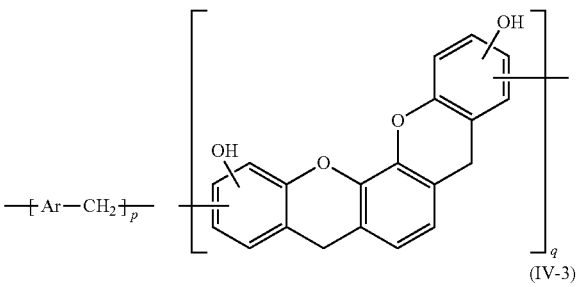

(IV-3)
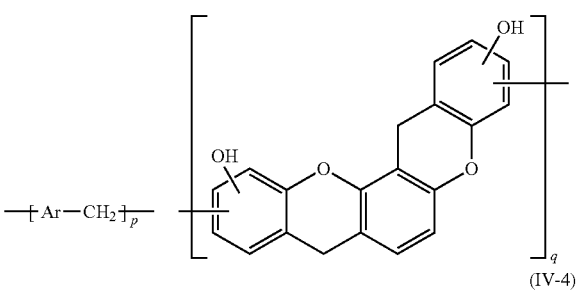

(IV-4)
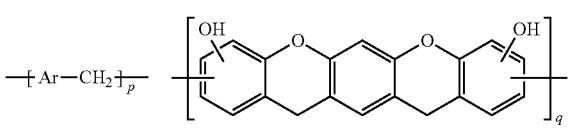

wherein, in Formula (IV-1) to Formula (IV-4), each of p and q independently represents a positive integer; and each Ar independently represents a group represented by the following Formula (IV-a) or the following Formula (IV-b); and (IV-a)

(IV-b)

wherein, in Formula (IV-a) and Formula (IV-b), each of $R^{21}$ and $R^{24}$ independently represents a hydrogen atom or a hydroxyl group; and each of $R^{22}$ and $R^{23}$ independently represents a hydrogen atom or an alkyl group having from 1 to 8 carbon atoms.

6. The epoxy resin molding material according to claim 1, further comprising a silane coupling agent.

7. The epoxy resin molding material according to claim 6, wherein the silane coupling agent comprises a silane coupling agent having a phenyl group.

8. The epoxy resin molding material according to claim 7, wherein the silane coupling agent having a phenyl group has a structure in which a phenyl group is directly bound to a silicon atom.

9. The epoxy resin molding material according to claim 6, wherein an amount of attachment of a silicon atom derived from the silane coupling agent per specific surface area of the inorganic filler is from $5.0 \times 10^{-6}$ mol/m$^2$ to $10.0 \times 10^{-6}$ mol/m$^2$.

10. The epoxy resin molding material according to claim 1, wherein a content of the inorganic filler is from 60% by volume to 90% by volume of the solid content of the epoxy resin molding material.

11. The epoxy resin molding material according to claim 1, which is in an A-stage state.

12. The epoxy resin molding material according to claim 11, wherein a mass reduction rate after heating at 180° C. for 1 hour is 0.1% by mass or less.

13. A molded product obtained by molding the epoxy resin molding material according to claim 1.

14. The molded product according to claim 13, having a diffraction peak in a diffraction angle 2θ range of from 3.0° to 3.5° in an X-ray diffraction spectrum obtained by an X-ray diffraction method using CuKα rays.

15. A molded cured product obtained by curing the molded product according to claim 13.

16. The molded cured product according to claim 15, having a diffraction peak in a diffraction angle 2θ range of from 3.0° to 3.5° in an X-ray diffraction spectrum obtained by an X-ray diffraction method using CuKα rays.

17. A method for producing a molded cured product, the method comprising curing the molded product according to claim 13 by heating.

18. The epoxy resin molding material according to claim 1, wherein the epoxy resin represented by formula (II) comprises an epoxy resin represented by the following formula (II-2):

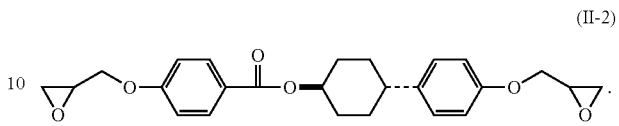

(II-2)

19. The epoxy resin molding material according to claim 18, wherein the curing agent comprises a compound selected from the following formulas:

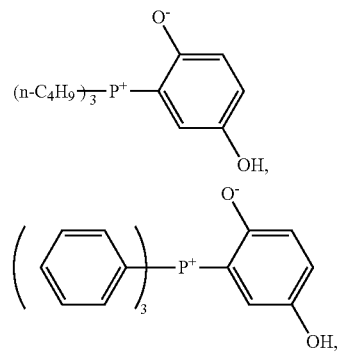

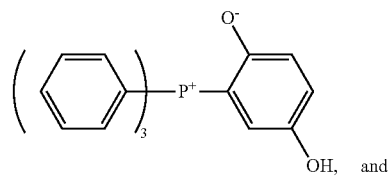

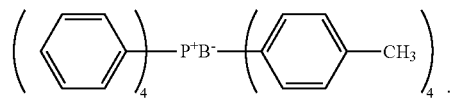

* * * * *